Patented June 19, 1934

1,963,579

UNITED STATES PATENT OFFICE 1,963,579

PROCESS OF PREPARING MOLDING MIXTURES AND MOLDED ARTICLES THEREFROM

Ernst Elbel and Otto Süssenguth, Erkner, near Berlin, Germany, assignors to Bakelite Gesellschaft mit beschrankter Haftung, Berlin, Germany No Drawing. Application December 17, 1930, Serial No. 503,100. In Germany December 21, 1929

1 Claim. (Cl. 106—22)

In the insulation industry, the radio technique and in general usage, molding materials and molded articles made primarily from synthetic resins and various organic and inorganic fillers impregnated therewith, are being used with ever increasing satisfaction. Such molded articles are in general produced by mixing a resin in the A state, which may be either a resole or a novolak in which the necessary hardening agents have been incorporated, in liquid, solid or dissolved form with the filler, or else the fillers are impregnated with the resins. From these mixtures, molded objects are then made by pressing with subsequent heating or by pressing with simultaneous application of heat. It has also been proposed to mix hardenable synthetic resins in their partially hardened states with fillers, and then to press these mixtures to form molded objects. These experiments have, however, not led to satisfactory results since the uniformity and mechanical properties of the products made in this way are inferior to those of the objects made from A resins.

It has been found that valuable molding mixtures containing B resins are obtained, if the fillers are treated with solutions of the resitole resins. It is thus possible to mix the fillers with resitol resin solution, that is, to impregnate them. Further the resoles or the mixture of novolaks with hardening agents may be dissolved in a liquid which has the property of dissolving resitoles; the fillers are then impregnated with this solution, and the mixture of fillers and solution is then heated to the point of resitole formation. Finally the resin-forming compounds, i. e. phenol, aldehyde and a catalyzer, may be mixed with a filler and a solvent for resoles and resitoles and then the condensation of the resinous components, possibly with the addition of hardening agents, may be carried through to the formation of the resitole. To produce the resitole solutions, the procedures described in applications for patent Ser. No. 295,344 filed July 25, 1928 and Ser. No. 422,683 filed Jan. 22, 1930 can be used. According to the first of these resitoles (B resins) are dissolved in suitable solvents such as cyclic ketones, as cyclohexanone, the equivalent alcohols as cyclohexanol and their homologs and esters, furfural, hydrogenated naphthalenes, etc. and thinned if desired with diluents such as alcohol, benzol, turpentine, solvent naphtha and the like. According to the latter, resoles (A resins) are dissolved in resitole solvents and the resoles then brought to the resitole condition by heating in the presence of the solvents. The procedure can be further modified by reacting the initial resin-forming ingredients—as phenol or its homologs, resorcin, dihydroxydiphenyl-dimethylmethane, etc. with paraform or hexamethylenetetramine, etc.—in the presence of the solvent to the resitole condition; this forms the subject matter of an application Ser. No. 497,063, filed Nov. 20, 1930. As solvents, hydrated phenols, such as hexalin, methyl hexalin, hexa-hydrobetanaphthol or furfural are suitable. Such liquids as tetralin or brombenzol, which have no solvent action on the resitole may also be added to the solvents. In addition to the resitoles, as well as in mixtures with them, other hardenable or non-hardenable, natural or synthetic resins may be used in every instance. Further it is also possible to treat the solutions of the resitoles or the molding mixtures containing the resitole solutions by adding catalysts, plasticizers, hardening agents, fireproofing material, etc. These materials may be added to the mixture at any convenient stage of the manufacturing process.

The fillers may be of any kind whatever. Those may be used which are impregnated by the resitole resin solution, that is to say all fibrous materials, as well as those which are merely cemented together, such as the usual mineral fillers.

The production of molded objects then proceeds in the customary manner, after the solvent has been either entirely or partially removed from the mixture. The mixtures have a good flow. They are hardened very quickly and give odorless products with outstanding mechanical and electrical properties.

The following definitions are intended for the terms "resole", "resitole", "resite" and "novolak". A resole is a resin of the type hardenable by heat to a final infusible and insoluble condition but reacted only to the stage where it still melts when heated and is soluble in acetone; this is also known as the A stage. A resitole is a resin of the same type as a resole but further reacted to a B stage where it has become infusible, i. e., it does not melt though it softens decidedly on heating, and it is insoluble but swells in acetone. A resite is the same heat-hardenable resin but reacted to the final or C stage, characterized by complete insolubility in acetone and infusibility without any material softening upon heating. A novolak is a distinctly different type of resinous reaction product in that practically speaking it does not harden upon heating to an insoluble infusible condition but remains soluble and fusible. The resins here defined are those made from the phenols or their homologs and derivatives with a methylene or aldehyde agent as is well understood by those skilled in the art.

We claim:

A composition to be molded comprising a phenol-aldehyde resin and a filler, the resin being in solution in a solvent selected from the group of hydrogenated aromatic hydrocarbons, hexahydrogenated phenols and their esters, hydroaromatic cyclic ketones and reacted to a resitole condition to form a quick hardening mass upon molding under heat and pressure.

ERNST ELBEL.
OTTO SÜSSENGUTH.